United States Patent [19]
Martin et al.

[11] Patent Number: 5,978,014
[45] Date of Patent: Nov. 2, 1999

[54] VIDEO TTY DEVICE AND METHOD FOR VIDEOCONFERENCING

[75] Inventors: Bryan R. Martin, Campbell; Truman Joe, San Jose; Richard Medugno, Fremont, all of Calif.

[73] Assignee: 8×8, Inc., Santa Clara, Calif.

[21] Appl. No.: 08/934,184

[22] Filed: Sep. 19, 1997

[51] Int. Cl.$^6$ .................................................. H04N 7/14
[52] U.S. Cl. ........................... 348/15; 379/52; 379/93.17
[58] Field of Search ................................... 379/52, 92.17, 379/93.21; 348/14, 15, 16; 340/825.19

[56] References Cited

U.S. PATENT DOCUMENTS

| | | | |
|---|---|---|---|
| 3,643,229 | 2/1972 | Stuebe et al. | 395/737 |
| 4,546,383 | 10/1985 | Abramatic et al. | 348/19 |
| 5,289,521 | 2/1994 | Coleman et al. | 379/52 |
| 5,313,522 | 5/1994 | Slager | 379/52 |
| 5,375,160 | 12/1994 | Guidon et al. | 379/52 |
| 5,379,351 | 1/1995 | Fandrianto et al. | |
| 5,457,731 | 10/1995 | Witherspoon | 379/52 |
| 5,559,856 | 9/1996 | Dowens | 379/52 |
| 5,594,813 | 1/1997 | Fandrianto et al. | |
| 5,627,530 | 5/1997 | Israel et al. | 379/52 |
| 5,710,806 | 1/1998 | Lee et al. | 379/52 |
| 5,815,196 | 9/1998 | Alshawwi | 348/14 |

FOREIGN PATENT DOCUMENTS 406037924  2/1994  Japan ............... H04M 11/00

OTHER PUBLICATIONS

"H.324 Video Phone Standard", *Intel Corporation*, pp. 1–3 (1997).

"Computer Products For The Hearing Impaired", 3 pages (undated).

"ITU–T Recommendation V.8", *International Telecommini-cation Union*, 13 pages (Sep. 1994).

Primary Examiner—Curtis A. Kuntz
Assistant Examiner—Melur Ramakrishnaiah

[57] ABSTRACT

A video communications device used as part of a communication terminal in a video-conferencing arrangement provides the capability of real-time captioning along with real-time visual communication for the individuals with impaired hearing and others whose speech is not understandable or non-existent. The device enhances the ability of people with communication disabilities to communicate quickly and effectively with those who are similarly afflicted as well as with those who are not. The video communications device includes a camera and a teletype device (TTY) for transmitting and receiving teletype information. The camera captures local images and generates a set of video signals representing those images. A teletype device captures input data from a user and generates a set of data signals. The device can be configured for compatibility with conventional equipment and for alerting users of incoming calls nonaudibly.

29 Claims, 2 Drawing Sheets

VIDEO TTY DEVICE AND METHOD FOR VIDEOCONFERENCING

FIELD OF THE INVENTION

The present invention relates generally to communication systems. More particularly, the present invention relates to video communication systems having teletype technology for individuals using a visual mode of communication.

BACKGROUND OF THE INVENTION

Traditionally, the only real-time means of communication for the hearing impaired and others who do not speak or understand speech was via electronic mail, facsimile, or teletype machines. Recently however, a significant effort has been made to use video-conferencing equipment to provide real-time visual communication that will support signed language over an analog telephone line. Such equipment generally includes two or more communication terminals participating in the transmission and/or reception of data representing captured video images, typically along with signals representing speech. One type of conventional video-conferencing arrangement includes at least one communication terminal set up with a camera, an image processor, and a transmission device transmitting captured video images for display at the other terminal(s).

While the benefits of video-conferencing equipment are widely recognized, extensive use of video-conferencing equipment for signed language has been inhibited largely due to unavailability of a common network interface, high costs, inconvenience and poor video quality. Improving video quality and increased convenience have proven to be costly considerations. For this reason, there have been opposing pressures to develop certain more expensive systems with increased video quality and convenience and certain other systems that forego the convenience and quality criteria for the sake of reducing costs.

The benefits of video-conferencing equipment should be enjoyed by all. Existing systems provide video and audio capabilities with the emphasis on audio quality. The needs of those with verbal communication difficulties are significantly different. Until now, video-conferencing systems have not been designed in a way that readily accommodates individuals with these disabilities.

SUMMARY OF THE INVENTION

According to one embodiment, the present invention is directed to methods and arrangements for use in video-conferencing. Certain aspects of the present invention are directed to a video communications device and method for use in connection with video-conferencing between communication terminals over a communications channel. Local images are captured and a set of video signals representing the images are generated. A teletype device captures user-input data and generates a set of data signals representing the user-generated data. The set of data signals, the video data and audio data signals are multiplexed and sent over the communications channel and a processor-based circuit executes a program to cause the processor-based circuit to respond to either a mute-type command, or a detection of decreased audio input, by increasing video resolution for video data sent over the communication channel.

Another aspect of the present invention involves capturing local images and generating a set of video signals representing those images, and then using a teletype device to capture user-input data and generating a set of data signals representing the user-generated data; multiplexing and sending data information, including the set of data signals, the video data and audio data signals, over the communications channel, the data information including a request to initiate a video-conferencing call; and using a processor-based circuit to execute a program to cause the processor-based circuit to detect the request to initiate the video-conferencing call and provide an indication thereof to a user.

The above summary of the invention is not intended to describe each disclosed embodiment of the present invention. An overview of other example aspects and implementations will be recognizable from the figures and of the detailed description that follows.

BRIEF DESCRIPTION OF THE DRAWINGS

Other aspects and advantages of the present invention will become apparent upon reading the following detailed description and upon reference to the drawings in which.

Figure 1:
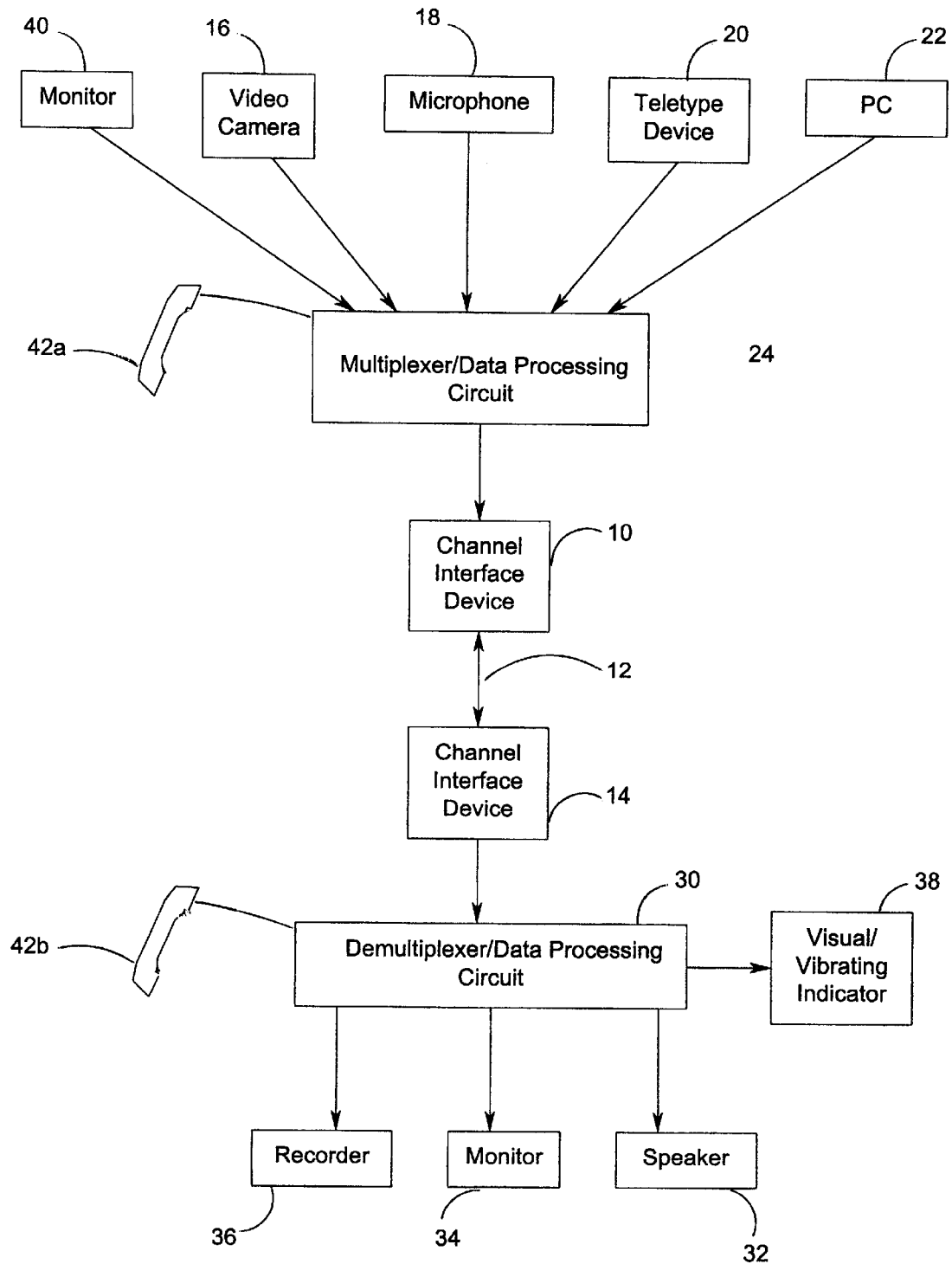
FIG. 1 is a block diagram of a video-conferencing system, according to a particular application of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention has been found to be particularly advantageous in video-conferencing applications requiring or benefiting from real-time visual communication in which at least one party is hearing impaired. The ability to use facial expressions, movements, and limited signing reduces the amount of information that a user has to type via manual teletype entry and adds to the enjoyment of the conversation. An appreciation of various aspects of the invention is best gained through a discussion of various application examples operating in such an environment.

Turning now to the drawings, FIG. 1 illustrates a data processing system for a video-conferencing application. The system includes data sending equipment depicted above a communication channel 12 of FIG. 1 and data receiving equipment depicted below the communication channel 12. While the sending and receiving of such data is often reciprocal in many data processing applications of this type as with the instant video-conferencing illustration, the configuration illustrated in FIG. 1 is simplified in this regard to facilitate the discussion.

At the sending end of the system of FIG. 1, a transmitting channel interface device 10 is used to send processed data over the communication channel 12 to a receiving channel interface device 14. The data that is presented to the channel interface device 10 is collected from various types of data sources including, for example, a video camera 16, a microphone 18, a teletype device 20, and a conventional personal computer 22. Examples of other sources, not shown in FIG. 1, from which such data can be collected include VCRs, digital still cameras, and IR keyboards. In one implementation, the video processor receives a block of data (such as a recorded movie from a VCR or a still view from a digital still camera) and annotates such input data with teletext for the hearing impaired viewer.

The data sources typically use buffers to store the data to be collected. The data collected from each of these data sources is received by multiplexer/data processing equipment (MDPE) 24. The MDPE 24 collects and formats the data collected from each of the input sources for transmission over the channel 12. A monitor 40 is optionally used with the video camera 16 to monitor the manner in which the video camera 16 captures the video images.

At the lower end of the system of FIG. 1, the formatted data communicated over the channel 12 is received by the channel interface device 14, which then presents the received data to demultiplexer/data processing equipment (DDPE) 30. The DDPE 30 is set-up to sort out the formatted data received over the channel 12 according to instructions previously sent by the MDPE 24. The demultiplexed data is then presented to the appropriate output source equipment. This equipment processes, for example, audio data to a speaker 32, video data and teletype data for display at a monitor 34 (displaying the images and the data input by the user in closed-caption format), and transmitted conferencing call and teletype data for a recorder 36 (such as a printer, VCR or magnetic recording device or other media).

Implementing the system as shown in FIG. 1 is advantageous in that the system can be programmed and configured to provide significant benefits to those using teletype equipment. According to one implementation, the MDPE 24 sends a request for a video-conferencing call, and the DMPE 30 detects the request for a video-conferencing call, and sends an output signal to activate a visual and/or vibrating indicator 38 to alert the user at the receiving end of the request. A visual indication, for example, is implemented as a built-in ring flasher. The output signal can be implemented in a number of ways, including for example as a code in the V.8 modem standard that signals video capability. The indicator 38 can also be implemented to include audible alarms. However, for the hearing-impaired, it is important that the indicator include a visual and/or vibrating component, or other non-audible indicator.

According to another implementation, a user at the sending end of the unit sends a code over the communication channel, for example, using a specially-designated key on the teletype device 20 or via the PC 22, indicating that no audio will be sent over the channel 12. The MDPE 24 responds to this mute-type code by increasing the rate at which video data is sent over channel 12, and thereby increasing the quality of the video display at the remote end of the system. Unlike conventional equipment which detects voice inactivity and inserts a comfortable level of background noise during such silent periods, the above approach uses the audio bandwidth for transmitting video data. In more specific implementations, this video-enhanced mode of operation is established in response to the detection of a privacy mode command, precluding transmission of audio, sent over the channel. For further information regarding use of a multiplexer to increase use of the transmission channel for video data, reference may be made to U.S. patent application Ser. No. 08/815,966, filed on Mar. 13, 1997 (Atty. Docket No. 11611.15US01), filed concurrently herewith and incorporated herein by reference. For each of the embodiments or for a separate embodiment operating under a video-only default mode, the video arrangement may be configured to decrease the amount of video data transmitted over the channel in response to a command or to detecting termination of such silent periods.

Yet another implementation uses summing, separation and feedback circuitry in conjunction with, or as part of the processor-based circuit shown above in FIG. 1. In this implementation, the video communications devices shown in the system of FIG. 1 are configured to operate as a conventional telephone, using telephone handsets 42a and 42b as separate speaker/microphone sets. In this implementation, the MDPE 24 sends a request for a video-conferencing call and, if the answering device is not compatibly configured and arranged to conduct the TTY-type video-conferencing call, the MDPE 30 detects the non-compatibility and switches to a normal telephone mode of operation (or to normal video-conferencing operation). This implementation allows a teletype device user to use a video communications device, according to the present invention, with conventional telephone and teletype equipment. For further information, reference may be made to U.S. patent application Ser. No. 08/934,179, entitled Video Interface Arrangement and Method Therefor (Atty. Docket No. 11611.38US01), filed concurrently herewith and incorporated herein by reference.

It will be understood that the processor-based circuit shown above in FIG. 1 can be implemented using any of a variety of processor arrangements, including the arrangement of the referenced patent applications and that disclosed in U.S. patent application Ser. Nos. 08/692,993 and 08/658,917, respectively entitled and relating to issued patents also entitled "Programmable Architecture and Methods for Motion Estimation" (U.S. Pat. No. 5,594,813) and "Video Compression and Decompression Processing and Processors" (U.S. Pat. No. 5,379,351). These applications and issued patents are, incorporated herein by reference.

As another example implementation, the arrangement of FIG. 1 is configured with the features of a VC55-type ViaTV Phone arrangement and with a keypad control console, such as a keypad, coupled into the MDPE 24 using conventional wiring or an infrared transmitter/receiver arrangement, to provide the hearing-impaired user with the ability to communicate with the Internet. Using the VC55 or a similarly constructed device that does not include an integrated internal infrared receiver, an external infrared receiver for coupling the keypad can be coupled into the auxiliary expansion port, using, for example, a receiver available from Sejin Electron, Inc. The features of the VC55 are described in the attached appendix, which is incorporated herein by reference.

Optionally, as an alternative to establishing a communication channel for more typical hearing-impaired two-way type person to person communications, the teletype device 20 of FIG. 1 is used in conjunction with the MDPE 24 to communicate with the Internet for applications relating to the sending and receiving of e-mail and accessing the World Wide Web.

Further, each of the above-described implementations can be configured to automatically answer incoming calls with personal greeting messages, with the ability to record messages, to provide remote message retrieval, and for adding supplemental data, including date and time-stamps, to recorded messages. In addition, the processor-based circuit can include a translation table for language support and may include a translation table for specially-assigned keys for the hearing impaired, or Deaf culture TTY abbreviations. These include but are not limited to: GA for go-ahead use to signal completion of a thought and typing segment; SK for ending a call; HOLD PLS for "hold please" for caller breaks; and SMILE for indicating levity with a transmitted message.

The MDPE 24 formats the collected data for transmission using any of a variety of modes of operation or capabilities.

For example, audio data may be formatted using a capability that supports the ITU-T G.711, G.723, or G.728 standard. When using the teletype device, the MDPE 24 collects and formats data for transmission according to the H.324 video phone standard. The H.324 standard specifies a common method for video, audio, and data to be communicated simultaneously using modem connection over an analog phone line. The H.324 standard uses a normal 28,800 bps modem connection between callers. Once a modem connection has been established, the H.324 standard specifies how digital video and voice compression technologies are used to convert sounds and facial expressions into a digital signal. For example, the H.324 standard defines how these signals are compressed to fit within the data rate allowed by analog phone lines and modem connections.

Figure 2:
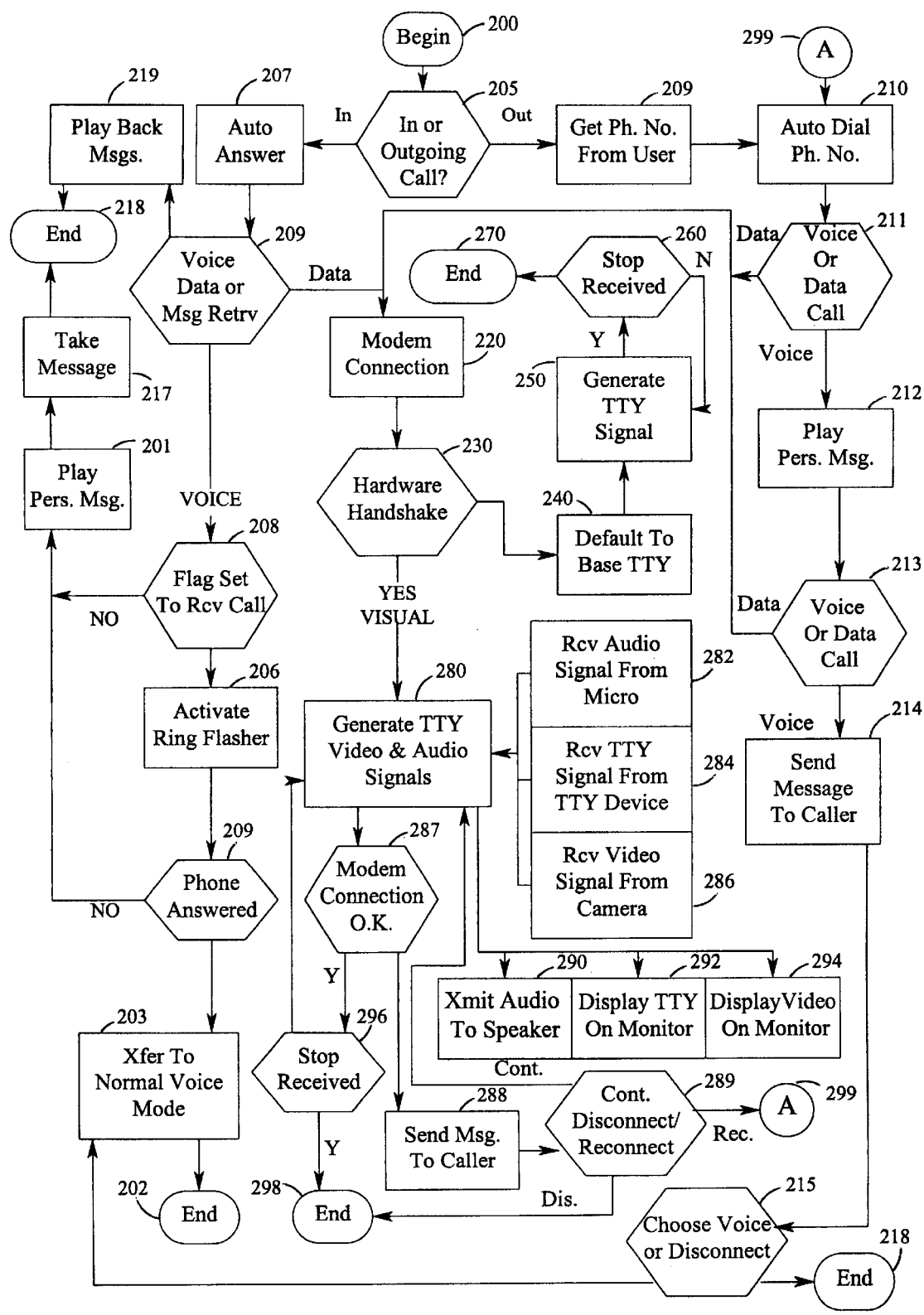
FIG. 2 is a flowchart illustrating an example method of operation of the system of FIG. 1, according to another particular application of the present invention.

FIG. 2 is a flowchart illustrating an example method of operation of the system of FIG. 1 from a general perspective. The routine is called in response to a command to initiate a connection with a second party either as an incoming phone call or as an outgoing phone call. Execution of the routine 200 begins at decision block 205. The system determines whether the call is incoming or outgoing. If the call is an incoming call, the system activates a pre-programmed subroutine to automatically answer the call 207. The auto-answer device determines whether the incoming call is a voice, data, or message retrieval call 209.

If the call is a voice call, at decision block 208 the system determines if the user has indicated that he wants to receive voice calls. If so, the system activates the ring flasher as depicted at block 206. The system will wait a pre-determined number of rings for the user to answer (block 204). If the call is answered, the system reverts to normal voice mode (block 203) and the routine ends (block 202). If the phone is not answered or if the user has not indicated he wants to receive voice calls, a personalized message is played to the caller as depicted at block 201. The system then takes a message from the caller, at block 217, and the routine ends at block 218.

The user can retrieve messages remotely through a touch-tone telephone, similar to a normal answering machine or voicemail. If, at decision block 209, the system determines that the incoming call is for message retrieval, the messages taken (block 217) are played back (block 219). This retrieval can be done in either voice or data mode. The routine then ends at block 218.

If the incoming call is a data call, a connection between modems is established using any standard modem protocol (block 220) via a channel 12 of FIG. 1. Once a connection is established, the system handshakes with the caller's system to check for visual capability with the H.324 videophone standard (block 230). If the caller does not have visual capability, the system defaults to a basic TTY mode using an ASCII character set (block 240). The MDPE 24 then generates TTY signals only (block 250). This continues until a stop command (block 260) is received which terminates the call and routine (block 270). This aspect of the invention allows the system to communicate with existing Teletype devices.

If the caller's system has visual capability, the MDPE 24 receives the data signals from the appropriate source equipment, including microphone 282, a teletype device 284 and a camera 286. The MDPE 24 then transmits the signals to the channel interface 10 using the H.324 standard. The bandwidth of an analog phone line is relatively small, so the MDPE 24 can only transmit a limited amount of data at one time. The DDPE 30 then sorts out the formatted data received according to instructions previously sent by the MDPE 24. The demultiplexed data is then presented to the appropriate output source equipment, including audio data to a speaker 290, video data to a monitor 294, and teletype information on-screen to a monitor 292. This transmission continues until a stop command 296 is executed that ends the routine 298.

At block 287, the system can be optionally configured to verify the quality of the connection between the two video-conferencing systems. If the quality of the connection falls below a predetermined level, a message is sent to the user (block 288). The user can then decide to continue the connection and simply note or record the status of the connection, disconnect and automatically reconnect, or disconnect, as shown at block 289. If the user wishes to continue the connection, the routine continues to transmit and receive at the highest quality possible. When the connection is lost, the system notifies the user and ends the routine at block 298. The user can then reconnect if he desires by returning to block 209. Returning to decision block 298, if the user decides to disconnect and end the call, the routine ends at block 298. If the user decides to disconnect and reconnect, the system transfers control at block 210 to re-establish a connection.

Returning to decision block 205, if the call is an outgoing call, the user inputs the desired phone number (block 209). The system then dials the phone number (block 210). When the caller answers, the routine determines if the transmission is voice or data (block 211). If the transmission is data, the routine transfers control to block 220 (discussed above).

If the transmission is voice, the routine plays a personalized message telling the person that the user is hearing impaired (block 212). If the caller has a hearing impaired communications device, the caller can then connect to that device. The routine will wait a pre-determined amount of time for the connection. If the call is still in voice mode, a message is sent to the user stating such (block 214). The user can then choose whether to communicate in voice mode or disconnect (block 215). If the user wants to communicate in voice mode, the system transfers to normal voice mode (block 203) and the routine ends at block 202. Otherwise, the call is disconnected and the routine ends at block 216.

In a particular embodiment, the data channel format for teletype/video for the above-discussed applications is modified from the motion video convention. In this application and embodiment, teletype information is transmitted at a relatively low bit-rate (approximately 1200 bps max) with reliable transmission being a highly desirable characteristic. Teletype information is textual in nature and consists of character text with the associated punctuation. The information is conveyed using either a pre-defined or a user-defined character set(s) or both. In this embodiment, the data channel is to be implemented as an open AL1 based data channel and supporting teletype information. Reliable transmission is provided via SRP or V.42LAPM with SRP support required and the use of V.42LAPM being optional. To indicate that the equipment at a terminal coupled to the channel has a teletype capability, an extension field of the existing H.245 Data Application Capability sequence and an SRP option is added to the Data Protocol Capability. This is illustrated in the example flow shown below:

```
DataApplicationCapability::=SEQUENCE
{
    application CHOICE
        {
            nonStandard  NonStandardParameter,
            t120   DataProtocolCapability,
            dsm-cc DataProtocolCapability,
            userDataDataProtocolCapability,
            t84    SEQUENCE
            {
                t84Protocol   DataProtocolCapability,
                t84Profile    T84Profile
            },
            t434   DataProtocolCapability,
            h224   DataProtocolCapability,
            nlpid  SEQUENCE
            {
                            nlpidProtocol
DataProtocolCapability,
                            nlpidData     OCTET STRING
            },
                            dsvdControl   NULL,
                            h222DataPartitioning
DataProtocolCapability,
            . . .
            {
                teleTypeProtocol
DataProtocolCapability
                teleTypeProfile   TeleTypeProfile
            }
        },
    maxBitRate INTEGER (0. . .4294967295), -- units 100 bits/sec
    . . .
}
DataProtocolCapability::=CHOICE
{
    nonStandard              NonStandardParameter,
    v14buffered              NULL,
    v421apm                  NULL, -- may negotiate to V.42bis
    hdlcFrameTunnelling      NULL,
    h310SeparateVCStack      NULL,
    h310SingleVCStack        NULL,
    transparent              NULL,
    . . .
    SimpleRetransmissionProtocol  NULL
}
```

Information on the opened data channel consists of OCTETS indexing a font codebook. One octet (0×0) is reserved and used to indicate out of band information. Out of band information consists of two possibilities, font changes and new character definitions for the current font.

Font switches are indicated by a two OCTET pair. The first octet (0×1) indicates a font switch. The next octet indicates which font to switch to.

New character definitions for the current font are indicated by the OCTET 0×2. A varying number of octets after this one is used to specify the new character. The immediately following octet indicates which character in the current font should be defined/redefined. 0×0 is not allowed as a character index. The next two octets indicate the dimension of the character definition in x and y pixels. The next octet indicates the relative display size of y dimension pixels to x dimension pixels given in the format nnn.mmmmm base 2. The next octet indicates the number of y dimension pixels in the character ascender. The following octet indicts the relative height (ascender) of the defined character to the default character size again specified in the format nnn.mmmmm base 2. The default size is implementation-dependent. Enough octets then follow to specify the bitmap of the defined character given in row major format with no inter-row gaps. Enough padding spaces are added at the end of the definition to align the definition to OCTET boundaries.

The ability to specify new characters in a font and switch fonts dynamically during communication allows for a total of 256*255=65280 characters. The support for more than one font and defining/redefining font characters is optional in the proposed teletype support. In order to simplify implementation, font '0' is defined corresponding to the ASCII character set with characters 128 to 255 and 0 being not defined. The height of font '0' exclusive of character redefinition's will be the default character size in the system. The ability to support multiple fonts and defining new font characters is specified in the TeleTypeProfile of the H.245 syntax as shown below:

```
TeleTypeProfile::=SEQUENCE
{
    numberOfFonts      INTEGER(1. . .256)
    advancedFontSupport BOOLEAN
}
```

If the numberOfFonts supported is greater than 1, advancedFontSupport must be true. If the numberOfFonts supported is equal to 1, advancedFontSupport can be true or false.

The various embodiments described above are provided by way of illustration only and are not intended to limit the invention. Those skilled in the art will readily recognize various modifications and changes that may be made to the present invention without strictly following the example embodiments and applications illustrated and described herein. The scope of the present invention is set forth in the following claims.

What is claimed is:

1. A video communications device for use in a video-conferencing arrangement having communication terminals in communicating over a communications channel, comprising:

a camera for capturing local images and for generating a set of video signals representing the captured images;

a teletype device arranged to capture data input by a user and to generate a data signal representing the data input by the user;

means for alerting a user of a device-status change; and a processor-based circuit constructed and arranged to send teletype, video data representing the captured local images, and audio data signals over the communications channel and having a program that, when executed, causes the processor-based circuit to perform the following steps: detect a request for a video-conferencing call; and send an output signal to activate the indicator.

2. A video communications device, according to claim 1, further including a display co-located with the camera for providing a visual representation of the captured images and teletype information, and wherein the processor-based sends the teletype, video data and audio data signals over the communications channel in the same bandwidth using a H.324 Video Phone Standard.

3. A video communications device, according to claim 1, wherein the indicator includes a visual display.

4. A video communications device, according to claim 1, wherein the indicator includes a vibrator constructed and arranged to be sensed by a user.

5. A video communications device, according to claim 1, further including a display co-located with the camera and arranged to provide a visual representation of the camera picture and of the data input by the user.

6. A video communications device, according to claim 3, further including a display providing a visual representation of the camera picture and of the data input by the user in closed-caption format.

7. A video communications device, according to claim 1, further including a teletype device for capturing teletype data signals that defaults to basic teletype mode when connected to another teletype device that does not have video capability.

8. A video communications device, according to claim 1, wherein the processor-based circuit further includes a protocol for using the V.8 modem standard to connect and communicate between callers.

9. A video communications device, according to claim 6, wherein the processor-based circuit further includes a protocol means for detecting a code in the V.8 modem standard that signals video capability.

10. A video communications device, according to claim 1, wherein the indicator includes a built-in ring flasher.

11. A video communications device, according to claim 1, wherein the teletype device is further constructed and arranged to capture teletype data signals and automatically answer calls with personal messages and takes messages.

12. A video communications device, according to claim 11, wherein the teletype device is further constructed and arranged to answer with pre-recorded messages and to record incoming messages.

13. A video communications device, according to claim 11, wherein the teletype device is further constructed and arranged to provide remote message retrieval.

14. A video communications device, according to claim 1, further including a keyboard for receiving user-input input data.

15. A video communications device, according to claim 1, further including a serial-data port off for communicating with a peripheral device.

16. A video communications device, according to claim 1, wherein the processor-based circuit further includes a translation table for language support.

17. A video communications device, according to claim 1, wherein the processor-based circuit further includes means for recording video calls.

18. A video communications device, according to claim 17, wherein the means for recording video calls further includes an output port for coupled video data to a peripheral recorder.

19. A video communications device, according to claim 17, wherein the means for recording video calls further includes means for adding supplemental data, including dates.

20. A video communications device, according to claim 1, wherein the processor-based circuit further includes a switching circuit for enabling the video communications device to act as either a standard videophone.

21. A video communications device, according to claim 1, wherein the processor-based circuit further includes a privacy mode precluding transmission of audio.

22. A video communications device, according to claim 1, wherein the teletype device includes a keyboard having a key assignment for Deaf culture TTY abbreviations, including at least one of the following: a go-ahead command to signal completion of a thought and typing segment; a signal for ending a call; a signal to indicate for "hold" for caller breaks; and a signal for indicating levity with a transmitted message.

23. A video communications device, according to claim 1, wherein the processor-based circuit further includes a control circuit permitting the video communications device to operate as a normal telephone.

24. A video communications device, according to claim 1, wherein the program further causes the processor-based circuit to respond to either a mute command, or a detection of decreased audio input, by increasing video resolution for video data sent over the communication.

25. A video communications device for use in a video-conferencing arrangement having communication terminals in communicating over a communications channel, comprising:
   a camera for capturing local images and for generating a set of video signals representing those images;
   a teletype device arranged to capture data input by a user and to generate a set of data signals representing the data input by the user; and
   a processor-based circuit constructed and arranged to send teletype, video data representing the captured local images, and audio data signals over the communications channel and having a program that, when executed, causes the processor-based circuit to respond to either a mute-type command, or a detection of decreased audio input, by increasing video resolution for video data sent over the communication.

26. A video communications device for use in a video-conferencing arrangement, according to claim 25, further including a telephone handset coupled to the processor-based circuit, and wherein the processor-based circuit is further constructed and arranged to control the video communications device as a normal telephone.

27. A method for video-conferencing between communication terminals over a communications channel, comprising:
   capturing local images and generating a set of video signals representing the images;
   using a teletype device to capture user-input data and generating a set of data signals representing the user-generated data; and
   multiplexing the set of data signals, the video data and audio data signals over the communications channel and, using a processor-based circuit, executing a program to cause the processor-based circuit to respond to either a mute-type command, or a detection of decreased audio input, by increasing video resolution for video data sent over the communication channel.

28. A method for video-conferencing between communication terminals over a communications channel, comprising:
   capturing local images and for generating a set of video signals representing those images;
   using a teletype device to capture user-input data and generating a set of data signals representing the user-generated data;
   multiplexing and sending data information, including the set of data signals, the video data and audio data signals, over the communications channel, the data information including a request to initiate a video-conferencing call; and
   using a processor-based circuit, executing a program to cause the processor-based circuit to detect the request to initiate the video-conferencing call and provide an indication thereof to a user.

29. A video communications device for use in a video-conferencing arrangement having communication terminals in communicating over a communications channel, comprising:

a camera for capturing local images and for generating a set of video signals representing those images;

a teletype device arranged to capture data input by a user and to generate a set of data signals representing the data input by the user; and a processor-based circuit constructed and arranged to send teletype, video data representing the captured local images, and audio data signals over the communications channel and having a program that, when executed, causes the processor-based circuit to perform the following steps: transmitting teletype information over the channel using a relatively low bit-rate; indicating that the video communications device has a teletype capability using an extension field of an existing data communication sequence; and recognizing that another video communications device has a teletype capability by examining an extension field of the existing data communication sequence.

\* \* \* \* \*

UNITED STATES PATENT AND TRADEMARK OFFICE
CERTIFICATE OF CORRECTION

PATENT NO. : 5,978,014

DATED : November 2, 1999

INVENTOR(S) : MARTIN et al.

It is certified that error appears in the above-identified patent and that said Letters Patent is hereby corrected as shown below:

Col. 4, line 30: delete "," after the word "are".

Col. 8, line 10: "redefinition's" should read --redefinitions--.

Col. 8, line 55, insert "circuit" after the word "processor-based".

Col. 9, line 35, delete "off" after the word "port".

Col. 9, line 54, delete "either" after the word "as".

Signed and Sealed this

Twenty-sixth Day of December, 2000

Attest:

Q. TODD DICKINSON

*Attesting Officer*  *Director of Patents and Trademarks*